Patented Jan. 19, 1954

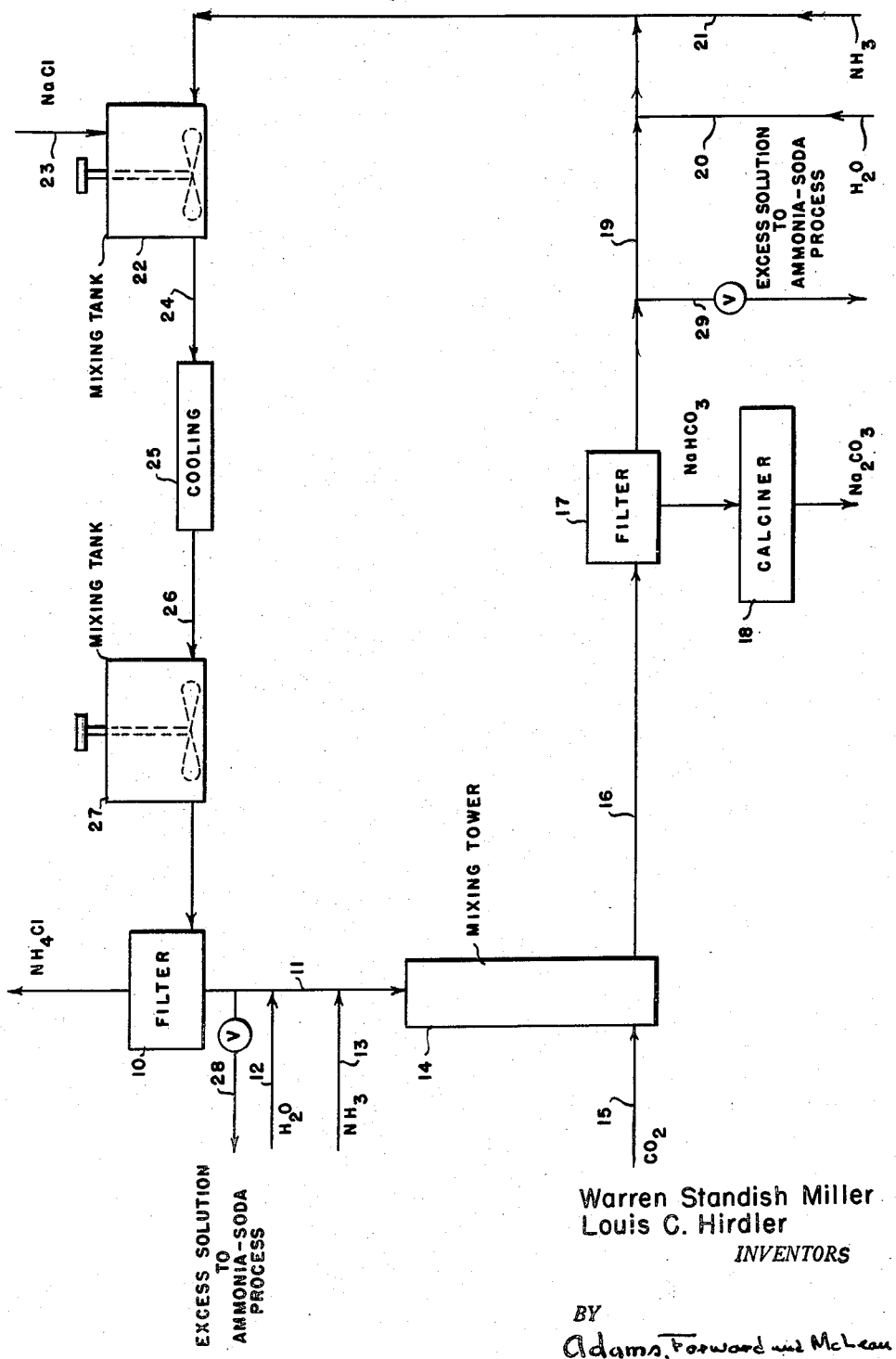

2,666,686

UNITED STATES PATENT OFFICE 2,666,686

PRODUCTION OF SODIUM BICARBONATE AND AMMONIUM CHLORIDE IN MODIFIED AMMONIA-SODA TYPE PROCESS

Warren Standish Miller, Houston, Tex., and Louis C. Hirdler, Maplewood, La., assignors to Mathieson Chemical Corporation, a corporation of Virginia Application September 13, 1952, Serial No. 309,436

6 Claims. (Cl. 23—65)

Our invention relates to improvements in the production in merchantable form of ammonium chloride in a cyclical operation of the ammonia-soda type. More particularly, our invention relates to a cyclical operation which can be operated advantageously in conjunction with a conventional ammonia-soda process and in which the concentration of impurities is effectively controlled.

As is well known, the ammonia-soda process is operated commercially to produce sodium bicarbonate through a double decomposition reaction involving sodium chloride and ammonium bicarbonate produced by saturating a nearly saturated sodium chloride brine with ammonia and with carbon dioxide obtained ordinarily from the calcination of limestone. The sodium bicarbonate is crystallized out of solution and ordinarily is converted by calcination to sodium carbonate, the carbon dioxide produced being utilized in the carbonation step of the process. The liquor remaining after the separation of the sodium bicarbonate contains ammonium chloride in addition to ammonium bicarbonate and sodium chloride. Many attempts have been made to work up the mother liquor to separate ammonium chloride in solid form so that the residual liquid may be used again for the preparation of sodium bicarbonate. However, commercial operations of the ammonia-soda process conventionally treat the liquor remaining after bicarbonate separation with lime, obtained from the calcination of limestone, in order to recover ammonia which is utilized in the ammoniation step of the process and ultimately discard a portion of the usable salt and all of the chloride ion as calcium chloride.

In our application Serial No. 248,190 filed September 25, 1951, now U. S. Patent No. 2,622,004, issued December 16, 1952, we disclosed a cyclic two-stage process characterized by particular operating procedure and limiting conditions, which provides a process of commercial feasibility by producing both sodium bicarbonate and ammonium chloride in good yield and quality in a flexible operation without need of refrigeration, evaporation or use of contaminating extraneous precipitating agents. The process is characterized by establishing a cycle wherein an aqueous liquor containing sodium, ammonium, chloride, hydroxide and bicarbonate ions is circulated between a sodium bicarbonate producing stage and an ammonium chloride producing stage and in which the composition of the circulating liquor is controlled by split addition of the ammonia required in a particular manner while adding the usual equi-molar quantities of sodium chloride in the form of the solid salt, carbon dioxide and water and while removing equivalent quantities of crystallized sodium bicarbonate and ammonium chloride. Carbon dioxide is added to the ammoniated, salt-containing liquor in the sodium bicarbonate producing stage in an amount producing a ratio of bicarbonate to the sum of bicarbonate and hydroxide ions of about 0.60 to 0.80 and the temperature is controlled at about 28° to 60° C. while separating crystallized sodium bicarbonate. The recovered liquor is circulated to the ammonium chloride producing stage and less than the molar requirement of make-up water for a complete cycle is added. Approximately half but less than the molar requirement of ammonia for the double decomposition reactions of the complete cycle also is added to the circulating liquor until the ratio of bicarbonate to the sum of bicarbonate and hydroxide ions is about 0.37 to 0.42. Sodium chloride in the form of solid salt is added to the circulating liquor and the temperature of the liquor is controlled at about 20° to 40° C. while dissolving the salt and separating crystallized ammonium chloride. The remaining make-up water and ammonia are added to the circulating liquor which is then circulated to the sodium bicarbonate producing stage.

The cyclic process is particularly advantageous in that both sodium and chlorine values are recovered in useful form while producing good yields of sodium bicarbonate and ammonium chloride of high quality. Moreover, the need for refrigeration, evaporation or use of contaminating extraneous precipitating agents is eliminated. The chief problem of operation of the cyclic process, however, is that it requires a close control of solution composition because of its cyclic nature. Also, in this process certain soluble impurities, such as sodium sulfate, may be introduced with the solid salt which should be removed before they build up to excessive concentrations. Thus although the process can tolerate reasonable accumulation of sulfate, the latter, however, must not be allowed to accumulate to such a point that precipitation of sodium sulfate occurs, and therefore means should be provided for the removal of soluble impurities. Although the conventional ammonia-soda process has the disadvantage of loss of chlorine values as discarded chloride ions, it does produce high yields of good quality sodium bicarbonate.

We have now found that operating the two-stage cyclic process in a deliberate state of unbalance produces an excess of solution over that of the starting solution which can be advantageously utilized in a conventional ammonia-soda process, and which also can be advantageously used to control impurities, while maximizing sodium bicarbonate yield without undue loss of ammonium chloride yield. Operating flexibility is thus introduced into the cyclic process. Our cyclic process is chiefly characterized by the addition of more than the molar requirement of water for a complete cycle in the two-stage process in which the composition of the circulating liquor is controlled by split addition of the ammonia required in a particular manner while adding solid sodium chloride and carbon dioxide and removing sodium bicarbonate and ammonium chloride.

It is particularly desirable as a practical matter to operate the cyclic process in conjunction with the conventional ammonia-soda process as the ammonia-soda process offers a means of ammonia recovery and a cheap source of carbon dioxide from its lime kilns. Thus, existing equipment of the ammonia-soda process may be advantageously utilized in our cyclic process to provide carbon dioxide and to recover ammonia from reject excess solution of the cyclic process. Moreover, bleeding off the excess solution produced by the addition of excess water advantageously removes impurities and can be used to control the amount of impurities in the cyclic system. The concentration of an impurity, such as sodium sulfate, is advantageously controlled by adding enough excess water so that the quantity of sodium sulfate added per cycle with the sodium chloride is exactly equivalent to that bled out in the excess solution. Thus, the sodium sulfate may be allowed to build up to an operable concentration and kept at that concentration by removing any sodium sulfate added during the cycle in the excess solution removed. The quality of the solution is such that it can be processed in an ammonia-soda process.

The quantity of excess solution may be considerable in commercial operation, for example 10 per cent of the plant capacity, and substantial cost savings are realized in utilizing the solution in the ammonia-soda process. Thus, by combining the cyclic process and the ammonia-soda process the highest yields of high quality products are obtained and reject materials are effectively utilized.

According to our invention, a cyclic two-stage process for production of sodium bicarbonate and ammonium chloride from solid salt, carbon dioxide, ammonia and water is provided in which an aqueous liquor containing sodium, ammonium, chloride, hydroxide and bicarbonate ions is circulated between a sodium bicarbonate producing stage and an ammonium chloride producing stage. Carbon dioxide is added to the ammoniated, salt-containing liquor in the sodium bicarbonate producing stage in an amount producing a ratio of bicarbonate to the sum of bicarbonate and hydroxide ions of about 0.60 to 0.80, and the temperature of the liquor is controlled at about 28° to 60° C. while separating crystallized sodium bicarbonate. The recovered liquor is circulated to the ammonium chloride producing stage, and less than the total amount of make-up water to be used is added, the total amount being more than the molar requirement for a complete cycle. Approximately half but less than the molar requirement of ammonia for the double decomposition reactions of the complete cycle also is added to the circulating liquor until the ratio of bicarbonate to the sum of bicarbonate and hydroxide ions is about 0.37 to 0.42. Sodium chloride in the form of solid salt is added to the circulating liquor, and the temperature of the liquor is controlled at about 20° to 40° C. while dissolving the salt and separating crystallized ammonium chloride. The remaining make-up water and ammonia are added to the resulting liquor which is then circulated to the sodium bicarbonate producing stage.

In our process, an excess of solution remains over that of the starting solution and is bled out of the cycle either after the sodium bicarbonate producing stage or the ammonium chloride producing stage. The excess solution is bled off and charged to a conventional ammonia-soda process that is operated in conjunction with our cyclic process, for further processing or to recover ammonia. The excess solution may be introduced into various stages of the ammonia-soda process. For example, if the excess solution is bled off after the precipitation of ammonium chloride it is desirable to introduce the solution to the carbonating step or the ammoniation step to recover sodium bicarbonate. If the excess solution is removed after the precipitation and removal of sodium bicarbonate, it is desirable to introduce it into the ammonia recovery system of the ammonia-soda process.

The process of our invention produces an excess solution which can be utilized in a conventional ammonia-soda process and therefore permits an integrated operation for producing sodium bicarbonate and ammonium chloride, in which a cheap and available source of carbon dioxide and existing plant equipment can be utilized. Moreover, the excess solution provides an effective means of controlling the concentration of undesirable impurities in the cyclic process by removing them from the cycle while maintaining good yields of ammonium chloride and sodium bicarbonate.

The total amount of water required in the process of our invention is more than the molar requirement for a complete cycle and may be added in one amount or in successive portions. The amount of water in excess of the molar requirement is not critical. For example, about 5 to 15 per cent is an advantageous practical range. However, too much excess water will decrease the recovery of ammonium chloride and the practical upper limit is governed by this factor. For example, in the ammonium chloride producing stage when excess water is added before or as crystallization of the ammonium chloride occurs the excess water becomes saturated with sodium chloride and ammonium chloride. Therefore, part of the sodium chloride added and also part of the ammonium chloride which previously would have precipitated, must now go to saturate the excess water. The recovery of ammonium chloride is therefore reduced very slightly while the consumption of sodium chloride is increased slightly, for example, about 5 to 20 per cent, over that of a cycle using only the molar requirement of water.

As the volume of solution is now increased slightly, the composition of the solution is also changed slightly, due to the larger quantity of sodium chloride and ammonium chloride now present in relation to the same amount of hydroxide and bicarbonate ions present. After crystallization of ammonium chloride, as the volume of solution is greater and as the composition of the solution is slightly different, a slightly larger quantity of carbon dioxide and ammonia than in a cyclic system using only the molar requirement of water must be added in order to end up with a solution, after precipitation of sodium bicarbonate, of exactly the same composition or ionic ratios as before. The volume of the final solution is, of course, still greater than the starting solution and the excess may be removed at this point. The yield of sodium bicarbonate is slightly increased due to the larger quantity of solution carbonated.

In the process of our invention, it is particularly desirable to operate with a temperature of about 40° to 60° C. in the sodium bicarbonate producing stage and a temperature of about 20° to 35° C. in the ammonium chloride producing stage. It is also particularly desirable to control the rise in the ratio of bicarbonate to the sum of bicarbonate and hydroxide ions by carbonation in the sodium bicarbonate producing stage to a ratio of 0.62 to 0.67 and to control the reduction in the ratio by ammonia addition in the ammonium chloride producing stage to a ratio of 0.38 to 0.40. There are special advantages in commercial operation according to our invention to be obtained by adding approximately half the ammonia and approximately half the water, i. e. about 45 to 55 per cent in each stage. The water is added in each stage with greatest advantage by washing the crude cake of sodium bicarbonate or ammonium chloride removed by filtration or centrifuging and returning the washings to the circulating liquor.

In the ammonia-soda system, the molar concentrations of reactants per 1000 moles of water are conveniently expressed as ratios:

$$x = \frac{NH_4^+ + NH_3}{NH_4^+ + NH_3 + Na^+}$$

$$y = \frac{NH_3 + HCO_3^-}{NH_4^+ + NH_3 + Na^+}$$

$$z = \frac{HCO_3^-}{HCO_3^- + OH^-}$$

According to our invention, the ratio, $z$, of the solution resulting from the precipitation and filtration of ammonium chloride then is controlled between about 0.37 and 0.42, but preferably between 0.38 and 0.40, by split addition of the ammonia to the circulated liquor, in part following the carbonation and sodium bicarbonate separation and in part following the solid salt addition and ammonium chloride separation. After the step of washing the ammonium chloride cake and adding ammonia to the filtrate, carbonation advantageously is carried to about $z = 0.60$ to $0.80$, but preferably about $z = 0.62$ or slightly higher for pressures up to about 45 p. s. i. g. and at temperatures up to about 60° C.

With these $z$ values, the addition of the water to be added can be split, and approximately half of the water to be added then is available at each end of the cycle for washing the precipitated salts. In many other suggested processes for separating ammonium chloride nearly all the water must be added in the carbonation step, leaving little or none for washing the bicarbonate cake.

In operation according to our invention $x$ may vary from about 0.50 to 0.80 and $y$ from about 0.05 to 0.55 in the liquor from which ammonium chloride has precipitated as the temperature varies from 20° to 45° C. In the liquor from bicarbonate precipitation, $x$ may vary from 0.6 to 0.95 and $y$ from 0.05 to 0.4 as the temperature varies from 28° to 60° C.

The operation according to our invention will be further illustrated by reference to the accompanying drawing which represents a schematic flow diagram of a cyclic two-stage process operated in conjunction with a conventional ammonia soda process.

In the drawing the aqueous liquor circulates continuously from the ammonium chloride filter 10 through making tower 14 to sodium bicarbonate filter 17 and then through mixing tank 22, cooling equipment 25 and mixing tank 27 back to filter 10. The addition of a part of the required make-up water is shown diagrammatically through line 12 to the liquor recovered from filter 10 and circulating in line 11. The water is advantageously added in the form of washings from the crude ammonium chloride filter cake separated by filter 10. Ammonia is added to the liquor circulating through line 11 by means of connection 13. The circulating liquor is charged to making tower 14 to which carbon dioxide is charged as indicated by means of line 15. Temperature control is provided in the usual manner in the making tower 14 to prevent a temperature rise above about 60° C. The bicarbonate liquor is circulated through line 16 to filter 17 for removal of crystallized sodium bicarbonate. The crude sodium bicarbonate may be passed after washing in the usual manner to calciner 18 for production of soda ash.

Water is added to the liquor recovered from filter 17 and circulating through line 19 by means of connection 20. Again the water is added in the form of washings from the crude sodium bicarbonate filter cake. Ammonia is added to the liquor circulating in line 19 by means of connection 21. Sodium chloride in the form of the solid salt is added as indicated by line 23 to the aqueous liquor mixing tank 22. The liquor from tank 22 is circulated through line 24, cooler 25 and line 26 to a second mixing tank 27 in which time is provided for complete solution of sodium chloride and precipitation of ammonium chloride. The liquor from mixing tank 27 then is passed to filter 10 for removal of precipitated ammonium chloride. Excess solution over that of the starting solution is produced after precipitation of both sodium chloride and ammonium chloride and may be removed after either precipitating step. For example, the excess solution may be removed from line 11 by line 28 or from line 19 by line 29 and sent to a conventional ammonium soda process operated in conjunction with the cyclic process for further processing, or to recover ammonia. For example, the excess solution may be introduced into the carbonation, ammoniation or ammonia recovery steps of the ammonia-soda process.

For the carbonation step in the cyclic process, conventional making towers of the type employed in the ammonia-soda process may be used for producing the sodium bicarbonate. In the operation of our invention, the temperature rise due to the ammoniation step prior to carbonation and the carbonation itself is employed to bring the temperature of the liquor to the desired range for filtering the sodium bicarbonate. Undue temperature rise is avoided and temperature is readily controlled in our process by means of the usual cooling facilities operated in connection with conventional making towers. The bicarbonate filter liquor then can be cooled with ordinary cooling water in conventional cooling equipment to the temperature desired for ammonium chloride precipitation and filtration. As shown in the drawing, the cooling appears to follow the salt addition, but it may be desirable to precool the bicarbonate filter liquor to the temperature desired for ammonium chloride precipitation, e. g. 30° C., before the addition of salt. After the addition of salt, ammonium chloride begins to precipitate and a smaller amount of additional cooling then is required to maintain the desired temperature.

Our process will be further illustrated by the following example:

In a solution having the molar composition indicated below and starting at a temperature of about 40° C., water used in washing a previous precipitate of sodium bicarbonate is added in the specified amount. The total amount of water added in both stages is about 10 per cent more than the molar requirement for a complete cycle. All at once or in successive portions, the specified amounts of solid sodium chloride and ammonia are added. The water, solid salt and ammonia may be added together or separately. The mass is cooled to about 30° C. and stirred. The sodium chloride goes into solution and ammonium chloride crystallizes out according to the following equation:

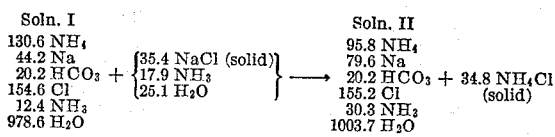

The ammonium chloride is separated by filtration or centrifuging. The solution, having the molar composition indicated below, is then used for the precipitation of sodium bicarbonate. To the solution, having a temperature of about 30° C., is added the balance of the total amount of water to be used. Advantageously, the ammonium chloride cake is washed with all or part of the 16.0 moles of water to be added. The water, ammonia and carbon dioxide are added, either together or separately, in the specified amounts, resulting in the following reaction:

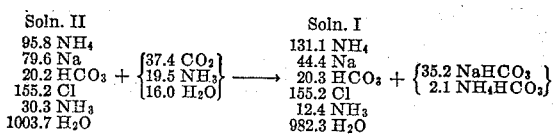

The temperature rises due to the heat of the reaction. It may be permitted to rise above 40° to as high as 60° C. but in this example the temperature at the completion of the reaction is to be about 40° C. It may be subsequently cooled to 40° C. as the reaction is completed, however, or the temperature may be controlled by cooling so that the solution does not exceed 40° C. The sodium bicarbonate is separated and the solution used to continue the cycle.

It will be noticed that in this cycle a larger volume of solution exists (more water present) after precipitation of both the ammonium chloride and sodium bicarbonate than in the cyclic process described in our application Serial No. 248,190, now U. S. Patent No. 2,622,004, issued December 16, 1952. Therefore, according to our invention, this excess solution can be bled off at either point of the cycle. By bleeding off this excess solution impurities build-up is prevented but the quality of the solution is such that it can be processed advantageously in a conventional ammonia-soda process operated in conjunction with our cyclic process with substantial mutual advantages.

We claim:

1. A combination process for the production of sodium bicarbonate and ammonium chloride from sodium chloride, carbon dioxide, ammonia and water, which comprises circulating an aqueous liquor containing sodium, ammonium, chloride, hydroxide and bicarbonate ions between a sodium bicarbonate producing stage and an ammonium chloride producing stage, adding carbon dioxide to the ammoniated salt-containing liquor in the sodium bicarbonate producing stage in an amount producing a ratio of bicarbonate to the sum of bicarbonate and hydroxide ions of about 0.60 to 0.80, controlling the temperature of the liquor at about 28° to 60° C. while separating crystallized sodium bicarbonate, adding less than the total amount of make-up water required, the total amount of water required being more than the molar requirement for a complete cycle to the liquor which is recovered and circulated to the ammonium chloride producing stage, adding approximately half but less than the molar requirement of ammonia to the circulating liquor to produce a ratio of bicarbonate to the sum of bicarbonate and hydroxide ions of about 0.37 to 0.42, adding sodium chloride as the solid salt, controlling the temperature of the liquor at about 20° to 40° C. while dissolving the salt and separating crystallized ammonium chloride, adding the remaining make-up water and ammonia to the liquor recovered, circulating the liquor to the sodium bicarbonate producing stage, removing liquor from the circulating system in excess of about the amount originally circulated between the sodium bicarbonate producing stage and the ammonium chloride producing stage, separately ammoniating in an ammonia-soda process a separate aqueous solution of sodium chloride, carbonating the ammoniated solution of sodium chloride by adding carbon dioxide, separating sodium bicarbonate from the carbonated solution and recovering ammonia from the liquor from the sodium bicarbonate separation step by adding lime and introducing the liquor removed from the circulating system in excess of about the amount originally circulated between the sodium bicarbonate producing stage and the ammonium chloride producing stage into at least one of the steps of ammoniation, carbonation and ammonia recovery in the separate ammonia-soda process.

2. The process of claim 1 in which the liquor in excess of about the amount originally circulated between the sodium bicarbonate producing stage and the ammonium chloride producing stage is removed after the sodium bicarbonate producing stage.

3. The process of claim 1 in which the liquor in excess of about the amount originally circulated between the sodium bicarbonate producing stage and the ammonium chloride producing stage is removed after the ammonium chloride producing stage.

4. The process of claim 1 in which the liquor in excess of about the amount originally circulated between the sodium bicarbonate producing stage and the ammonium chloride producing stage is introduced into the ammoniation step of the ammonia-soda process.

5. The process of claim 1 in which the liquor in excess of about the amount originally circulated between the sodium bicarbonate producing stage and the ammonium chloride producing stage is introduced into the carbonation step of the ammonia-soda process.

6. The process of claim 1 in which the liquor in excess of about the amount originally circulated between the sodium bicarbonate producing stage and the ammonium chloride producing stage is introduced into the ammonia recovery step of the ammonia-soda process.

WARREN STANDISH MILLER.
LOUIS C. HIRDLER.

No references cited.